United States Patent [19]

Van Der Voort et al.

[11] Patent Number: 5,223,936
[45] Date of Patent: Jun. 29, 1993

[54] PICTURE DISPLAY AND VIDEO SIGNAL PROCESSING CIRCUIT

[75] Inventors: Victor H. J. Van Der Voort; Frederick M. Boekhorst, both of Eindhoven, Netherlands

[73] Assignee: U.S. Philips Corporation, New York, N.Y.

[21] Appl. No.: 851,236

[22] Filed: Mar. 13, 1992

Related U.S. Application Data

[63] Continuation of Ser. No. 510,660, Apr. 18, 1990, abandoned.

[30] Foreign Application Priority Data

Aug. 22, 1989 [NL] Netherlands ............. 8902113

[51] Int. Cl.⁵ .................... H04N 5/57; H04N 5/64
[52] U.S. Cl. .................... 358/242; 358/254; 358/140
[58] Field of Search ............ 358/242, 252, 254, 255, 358/230, 56, 39

[56] References Cited

U.S. PATENT DOCUMENTS

| | | | |
|---|---|---|---|
| 2,438,256 | 3/1948 | Stein | 358/254 |
| 2,751,583 | 6/1956 | Jones | 358/254 |
| 4,309,719 | 1/1982 | Hinn | 358/39 |
| 4,338,623 | 7/1982 | Asmus et al. | 358/22 C |
| 4,556,906 | 12/1985 | Dischert et al. | 358/180 |
| 4,574,279 | 3/1986 | Roberts | 340/731 |
| 4,638,351 | 1/1987 | Clarke | 358/39 |
| 4,651,219 | 3/1987 | Rickert | 358/252 |
| 4,670,784 | 6/1987 | Goldberg | 358/141 |
| 4,730,215 | 3/1988 | Jose et al. | 358/140 |
| 4,760,455 | 7/1988 | Nagashima | 358/140 |
| 4,931,855 | 6/1990 | Salvadorini | 358/141 |
| 4,935,819 | 6/1990 | Pederson | 358/254 |
| 4,953,025 | 8/1990 | Saitoh et al. | 358/230 |

FOREIGN PATENT DOCUMENTS 0137585 5/1990 Japan .
8700058 8/1988 Netherlands .

*Primary Examiner*—Victor R. Kostak
*Assistant Examiner*—Jeffrey S. Murrell
*Attorney, Agent, or Firm*—Michael E. Marion

[57] ABSTRACT

Picture display device for displaying pictures having a first aspect ratio and pictures having a second aspect ratio on a display screen having the first aspect ratio, comprising a circuit for applying a signal to pixels which are not associated with the second aspect ratio picture when a second aspect ratio picture is being displayed. The picture display device further comprises an adjustable cover for covering not associated pixels when the picture having the second aspect ratio is being displayed and for uncovering these pixels when a picture having the first aspect ratio is being displayed.

9 Claims, 2 Drawing Sheets

PICTURE DISPLAY AND VIDEO SIGNAL PROCESSING CIRCUIT

This is a continuation of application Ser. No. 07/510,660, filed Apr. 8, 1990, now abandoned.

BACKGROUND OF THE INVENTION

The invention relates to a picture display device for displaying pictures having a first aspect ratio and pictures having a second aspect ratio on a display screen having the first aspect ratio, comprising means for applying a signal to pixels which are not associated with the second aspect ratio picture when a second aspect ratio picture is being displayed. Aspect ratio is herein understood to mean the ratio between the width and the height of the picture.

A picture display device of this type is known from Netherlands Patent Application NL-A-8700058 (PHN 12.005). When a picture having a second aspect ratio is displayed in this known picture display device, a signal is applied to the other portions of the screen for each line, resulting in a luminance which is equal to the average luminance of the line of the picture. The picture is displayed in an undistorted form in this way and there will be no sharp transitions in the ageing of the display screen or of the display elements (in projection television).

A drawback of this known picture display device is that the edges of the picture, the side panels, with an average luminance per line have a disturbing effect for the user of the picture display device.

SUMMARY OF THE INVENTION

One of the objects of the invention is to obviate the said drawback. To this end a picture display device according to the invention is characterized in that it further comprises adjustable cover means for covering said pixels when the picture having the second aspect ratio is being displayed and for uncovering said pixels when a picture having the first aspect ratio is being displayed. Luminance is herein understood to mean the light intensity (either with monochrome or color display) on the display screen.

This provides the possibility of covering the pixels which do not belong to the picture to be displayed so that the side panels, which have a given luminance, are not visible to the user.

A further embodiment of a picture display device according to the invention is characterized in that it is adapted to operate the cover means by means of a control signal which is an aspect ratio identification signal transmitted along with the picture.

This provides the possibility of automatically covering the side panels of the display screen when a picture having the second aspect ratio is being displayed.

A further embodiment of a picture display device according to the invention is characterized in that the cover means comprise at least one cover plate consisting of a plurality of parts which are pivotably interconnected.

Since the cover plates are pivotably interconnected, they occupy less space than cover plates which are formed as one assembly.

A further embodiment of a picture display device according to the invention is characterized in that it comprises a video signal processing circuit such that, upon display of the picture having the second aspect ratio, pixels of the screen which are not associated with the picture receive substantially the same luminance as an extreme pixel of a line of the picture.

This provides the simple possibility of preventing an uneving ageing of the display screen when a picture of the second aspect ratio, for example 4:3 is displayed. This is achieved by repeating the extreme pixel of each line of the 4:3 picture on the side panels. As a result there can never be a transition in ageing between the edge of the 4:3 picture and the side panels.

A still further embodiment of a picture display device according to the invention is characterized in that the video signal processing circuit comprises a dual port memory having inputs which are coupled to an A/D converter and outputs which are coupled to a D/A converter, said outputs being also coupled to weighting resistors for displaying the substantially uniform average luminance on the pixels which are not associated with the picture. A dual port memory is understood to mean a memory which can read and write simultaneously. This memory may also be replaced by two single port memories. This video signal processing circuit is particularly suitable for use in a direct vision picture display device.

BRIEF DESCRIPTION OF DRAWINGS

The invention will now be described in greater detail by way of example with reference to the accompanying drawings in which

FIGS. 3a-3c shows a 16:9 display screen on which a 4:3 displayed with the side panels being filled in.

DETAILED DESCRIPTION OF THE PREFERRED EMBODIMENTS OF THE INVENTION

Figure 1A:
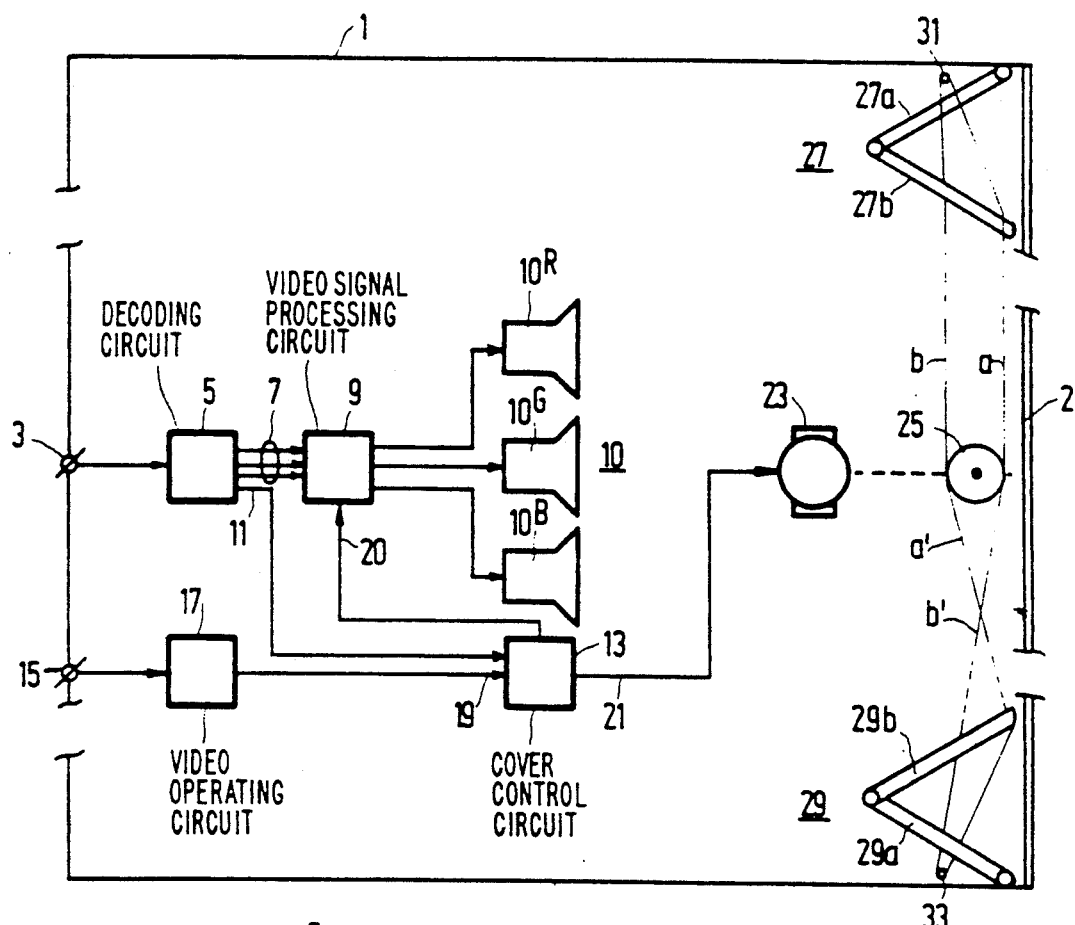
FIG. 1a shows an embodiment of a picture display device according to the invention and FIG. 1b shows a detail of this picture display device.

FIG. 1a shows an embodiment of a picture display device according to the invention in the form of a projection device. In this case the picture display device 1 has a display screen 2 with an aspect ratio of 16:9. A first input 3 is coupled to a decoding circuit 5 in which the incoming video signal is decoded and is applied in a decoded form to a video signal processing circuit 9 via a triple connection 7. This video signal processing circuit, which will be described in greater detail with reference to FIG. 2, supplies three signals to the three display elements 10R, 10G and 10B.

When a 4:3 picture is displayed on the 16:9 picture display device, uneven ageing of the display elements, on the portions of the screen not associated with the 4:3 picture, the side panels, is prevented in that a signal resulting in a given suitable luminance is generated. To render these signals displayed on the side panels invisible to the user, these side panels are covered with cover plates (27, 29) in this embodiment. These cover plates may be formed in different manners. One of the possibilities is that on both sides of the display screen a cover plate is pivotably connected to the side of the display screen. When the 4:3 picture is being displayed, the side panels are covered, for example under the control of a motor 23 as will be further described. To save space, it is alternatively possible to form the plate from a plurality of portions which are pivotably interconnected. This method is used in this embodiment.

Figure 1B:
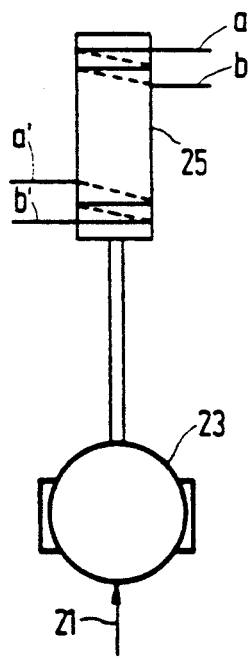

A cover control circuit 13 supplies an aspect ratio signal 20 to the video signal processing circuit and also supplies a control signal 21 driving the motor 23. The motor is coupled to a shaft 25. This shaft is coupled to the two cover plates 27 and 29 via wires. The cover plate 27 has two portions 27a and 27b which are pivotably interconnected. The side of the portion 27a which is not connected to the portion 27b is connected to a side of the display screen 2. The side of the portion 27b which is not connected to the portion 27a is connected to the shaft 25 via a wire a. This portion is also connected to the shaft 25 via a wire b extending via a pawl 31. The wires a and b may be interconnected and thus form one wire, see also FIG. 1b which shows the shaft 25 with the wires in detail. The other cover plate 29 is connected to the shaft 25 through a similar construction. This cover plate has also two portions 29a and 29b and is connected to the shaft 25 via wires a' and b' and a pawl 33, see also FIG. 1b.

If the incoming video signal comprises an aspect ratio identification signal, such as, for example in MAC/-PACKET signals, the decoding circuit 5 supplies a signal at a second output 11 to the cover control circuit 13, dependent on the aspect ratio. This cover control circuit controls the coverage of the side panels of the display screen when a 4:3 picture is being displayed. In addition, or instead, if the signal received by the decoding circuit does not comprise an aspect ratio identification signal, the user can cover the side panels via an operating input 15 of the display device 1 and a video operating circuit 17 via a second input 19 of the cover control circuit 13 when a 4:3 picture is being displayed and uncover the side panels for irradiation by the display elements 10 when a 16:9 picture is being displayed. It is alternatively possible to operate the cover plates electromagnetically instead of being driven by the motor.

Figure 2:
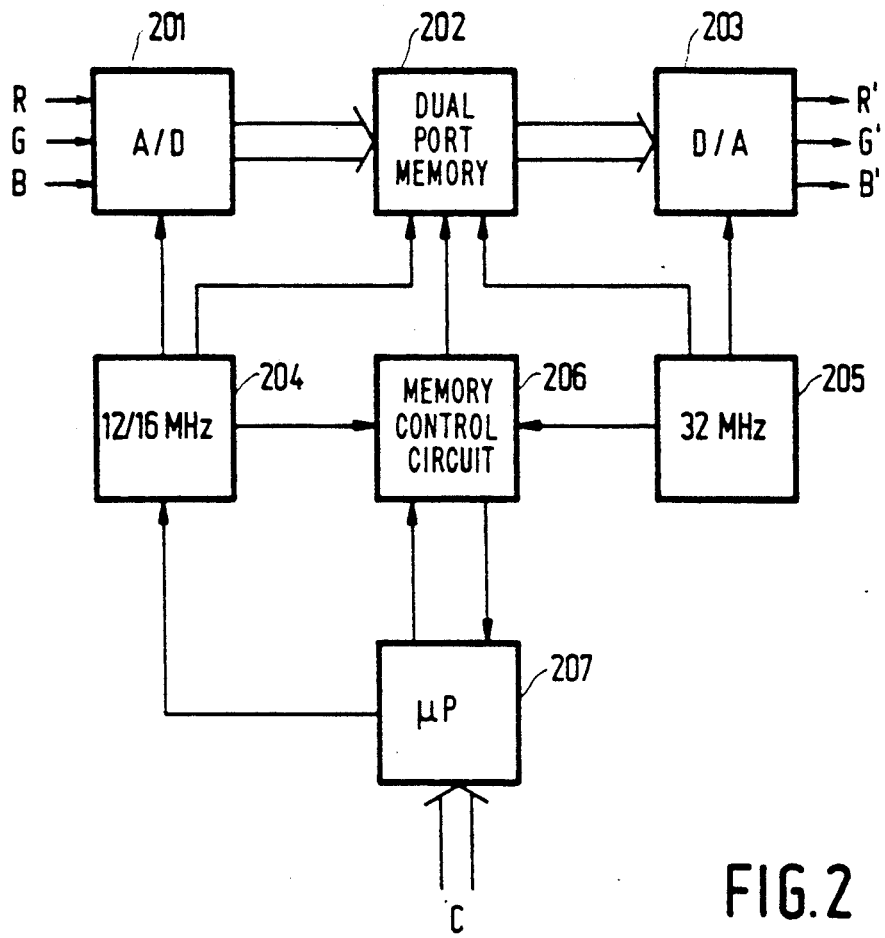
FIG. 2 shows a circuit for use in a picture display device according to the invention in which a 50 to 100 Hz conversion is also realised.

FIG. 2 shows a circuit for use in a picture display device according to the invention. This circuit is part of, for example, the video signal processing circuit 9 of FIG. 1 and also realises a 50 to 100 Hz conversion. The circuit receives input signals R, G and B (or Y, U and V) at three inputs at a field frequency of 50 Hz. These input signals are converted into digital signals in an A/D converter 201. Subsequently these digital signals are applied to a so-called dual port memory 202 (as is known, a dual port memory is understood to mean a memory which can read and write simultaneously). Instead of a dual port memory it is alternatively possible to use two memories in which the one memory writes a first field when the other memory reads a second field, and conversely. The dual port memory is controlled by two clocks, a first clock 204 having a frequency of 12 or 16 MHz and a second clock 205 having a frequency of 32 MHz, which is required in connection with the 50 to 100 Hz conversion.

The dual port memory is further controlled by a memory control circuit 206 which generates digital switching signals at the picture frequency for the memory control. The clocks 204 and 205 also control the memory control circuit 206. This memory control circuit is interactively controlled by a microprocessor 207 which in turn is controlled by control signals C from other portions (not shown) of the picture display device (the microprocessor receives, inter alia, the aspect ratio identification signal from the cover control circuit 13). The microprocessor also controls the 12/16 MHz clock 204 and when a 16:9 picture is being displayed, the clock is set at 16 MHz and when a 4:3 picture is being displayed, the clock is set at 12 MHz.

When displaying a 16:9 picture, the signals are written at a frequency of 16 MHz and read at a frequency of 32 MHz. This results in either a doubling of the line number or a doubling of the field number. When a 4:3 picture is displayed on the 16:9 display screen, it is necessary to perform a compression which is achieved by writing at a frequency of 12 MHz and reading at a frequency of 16 MHz. To obtain the line number doubling or the field number doubling also when the 4:3 picture is displayed, the 4:3 picture is read at a frequency of 32 MHz. The 12/16 MHz clock controls the A/D converter 201 and the 32 MHz clock controls a D/A converter 203. This D/A converter receives the processed video signal from the dual port memory 202 and supplies output signals (R', G' and B') at a field frequency of 100 Hz or with 1250 lines.

When a 4:3 picture is displayed on the 16:9 display screen, a luminance can be generated on the side panels so that there is no difference in ageing on the side panels of the display elements as compared with the 4:3 picture. According to a further aspect of the invention this luminance is obtained by repeating the first pixel of each line for the left-hand side panel and the last pixel of each line for the right-hand side panel. The dual port memory has tri-state outputs. The tri-state outputs have the property that the value of the output will decrease only slowly at the instant when the control signal is removed from the memory if the value of the output is high (digital "1"). The value of the output will have reached the level halfway between the digital high ("1") and the digital low ("0") only after approximately 100 microsec. Similarly as the value of the output is low (digital "0") at the instant when the control signal is removed from the memory, the value of the output will slowly increase. Now again the value of the output will have reached the level halfway between the digital high and the digital low after approximately 100 microsec. This property is utilized to fill in the side panels. At the start of scanning the pixels, the first pixel of the line is read from the memory 202. After the first pixel has been read, reading is stopped by means of the memory control circuit under the control of the microprocessor. As described hereinbefore, the outputs of the dual port memory retain the value for a certain period. A period of approximately 3 microsec is required for filling up the side panel. After this period the memory is further read until the last pixel of the relevant line and now again the outputs of the dual port memory retain the value for a certain period. In this way the right-hand side panel is also filled up. By retaining the first and the last pixel it is achieved that there is no longer any transition in ageing between the 4:3 picture and the side panels. If the 50 to 100 Hz conversion (line number doubling or field number doubling) is not required, the frequency of the clock 205 will be 16 MHz. It is alternatively possible to replace the A/D converter 201, the dual port memory 202 and the D/A converter 203 by an analog dual port line memory.

Figure 3:
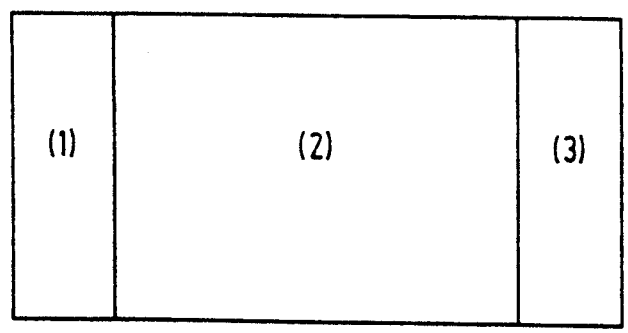

FIG. 3a shows the composition of the display screen. For displaying a 4:3 picture on the 16:9 display screen the first pixel is read for the portion to the left of the 4:3 picture (1), as described above, and it is subsequently retained (by means of the tri-state outputs of the memory), whereafter the 4:3 picture (2) is displayed. The last pixel is also repeated at the right-hand side of the picture (3) by using the said tri-state outputs.

FIG. 3b shows the situation as described in the said Netherlands Patent Application in which the average picture information (M) is displayed per line on the side panels. FIG. 3c shows the novel situation in which for each line the picture information of the first and last pixels of the 4:3 picture is displayed on the side panels (x and +, respectively).

By a repeated reading of the memory 202 it would of course also have been possible to fill up the side panels by repeating portions of the 4:3 picture.

Figure 4:
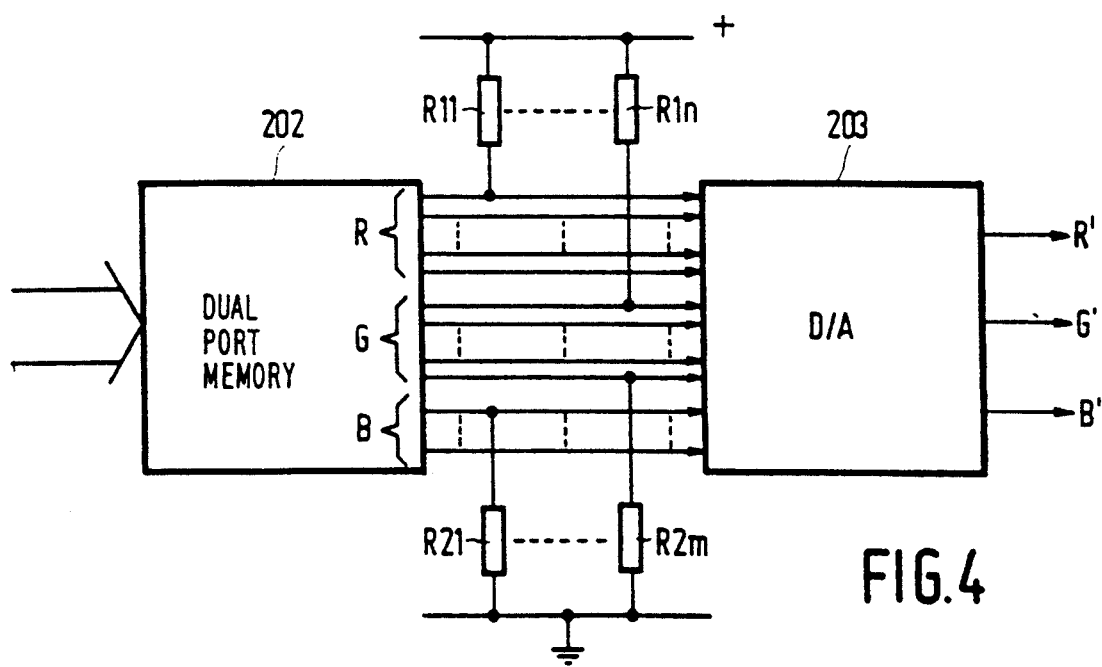
FIG. 4 shows a portion of a diagram of a circuit for use in a picture display device according to the invention for filling in a uniform color on the side panels.

FIG. 4 shows how the circuit of FIG. 1 can be adapted if it is desirable that a uniform color is displayed on the side panels, which color ensures that these side panels age to approximately the same extent as the central portion on which the 4:3 picture is displayed. This uniform color is chosen to be such that the different colors age to the same extent as the centre of the picture. As is shown in FIG. 4, the outputs of the dual port memory consist of three groups of digital signals for the three different colors (R, G, B), for example 8 bits for red (R), 8 bits for green (G) and 6 bits for blue (B). The different color gradations are obtained by rendering these outputs digitally high ("1") or digitally low ("0"). In order to display a uniform color on the side panels (when a 4:3 picture is displayed) each output of the dual port memory is connected to the positive power supply voltage or to ground via a resistor. In FIG. 4 this is shown for the upper output for red which is connected to the positive power supply voltage via a resistor R11, and for the upper output for green which is also connected to the positive power supply voltage via a resistor R1n. The upper output for blue is connected to ground via a resistor R21 and the lower output for green is also connected to ground via a resistor R2m. The other outputs of the dual port memory are also connected either to the positive power supply voltage or to ground, which is not shown in this Figure for the sake of simplicity. The values of the resistors should be chosen to be such that, when displaying the picture, these resistors do not have any influence and simultaneously have such values that the outputs are digitally high or digitally low for the side panels when the memory 202 operates.

It is alternatively possible to cover the side panels with an LCD panel when a 4:3 picture is displayed on a 16:9 picture display device. In order that no transition is observed between the side panels and the central portion of the screen when displaying 16:9 pictures, the full screen will preferably be provided with an LCD panel and only its side panels will be rendered opaque under the control of, for example the aspect ratio identification signal when 4:3 pictures are displayed. A drawback of this method is that in any case half the light intensity is lost. Moreover, large LCD panels are required for this solution.

We claim:

1. A picture display device for receiving a video signal and for displaying first pictures having a first width and second pictures comprising a line of pixels and having a second width which is more narrow than said first width on a display screen, said device comprising:

a) means for applying a signal to selected line portions of said display screen which are not associated with said second pictures when said second pictures are being displayed, said signal providing a luminance to at least one selected line portion of said display screen which is substantially equal to the luminance of at least one pixel of said line of pixels proximate to said at least one selected line portion; and b) adjustable cover means for covering said selected portions when said second pictures are displayed and for uncovering said portions when said first pictures are displayed.

2. A picture display device as claimed in claim 1, which is adapted to operate the cover means by means of a control signal.

3. A picture display device as claimed in claim 2, wherein the control signal for automatically operating the cover means is an aspect ratio identification signal forming a part of said video signal.

4. A picture display device as claimed in claim 3, wherein the cover means comprise at least one cover plate consisting of a plurality of pivotably interconnected portions.

5. A picture display device as claimed in claim 2, wherein the cover means comprise at least one cover plate consisting of a plurality of pivotably interconnected portions.

6. A picture display device as claimed in claim 2, wherein the applying means comprises means for applying a signal to a portion of the display screen to the left of each of said second pictures, which signal provides a luminance substantially corresponding to a luminance of a first pixel of a respective line and for applying a signal to a portion of the display screen to the right of each of said second pictures, which signal provides a luminance substantially corresponding to a luminance of a last pixel of the respective line.

7. A picture display device as claimed in claim 1, wherein the cover means comprise at least one cover plate consisting of a plurality of pivotably interconnected sections.

8. A picture display device as claimed in claim 1, wherein the applying means comprises means for applying a signal to a portion of the display screen to the left of each of said second pictures, which signal provides a luminance substantially corresponding to a luminance of a first pixel of a respective line and for applying a signal to a portion of the display screen to the right of each of said second pictures, which signal provides a luminance substantially corresponding to a luminance of a last pixel of the respective line.

9. A picture display device as claimed in claim 1, wherein applying means comprises a dual port memory having inputs which are coupled to an A/D converter and outputs which are coupled to a D/A converter, said outputs being also coupled to weighting resistors for displaying the substantially uniform average luminance on the pixels which are not associated with the second pictures.

* * * * *